United States Patent

Tsuyama et al.

[11] Patent Number: 5,159,991
[45] Date of Patent: Nov. 3, 1992

[54] SLIP CONTROL SYSTEM FOR AUTOMOTIVE VEHICLE

[75] Inventors: Toshiaki Tsuyama; Kazutoshi Nobumoto; Fumio Kageyama; Haruki Okazaki, all of Hiroshima, Japan

[73] Assignee: Mazda Motor Corporation, Hiroshima, Japan

[21] Appl. No.: 665,191

[22] Filed: Mar. 5, 1991

[30] Foreign Application Priority Data

Mar. 7, 1990 [JP] Japan .................................. 2-57591

[51] Int. Cl.⁵ .............................................. B60K 28/16
[52] U.S. Cl. ................................. 180/197; 364/426.01; 364/426.03
[58] Field of Search .................... 180/197; 364/426.01, 364/426.02, 426.03

[56] References Cited

U.S. PATENT DOCUMENTS

| | | | |
|---|---|---|---|
| 4,552,241 | 11/1985 | Suzuki | 180/197 X |
| 4,669,569 | 6/1987 | Suzuki et al. | 180/249 |
| 4,712,635 | 12/1987 | Sumiya et al. | 180/197 |
| 4,938,543 | 7/1990 | Parker et al. | 180/197 X |
| 4,971,400 | 11/1990 | Jonner | 180/197 X |

FOREIGN PATENT DOCUMENTS 275031 12/1986 Japan .................................. 180/197

Primary Examiner—Charles A. Marmor
Assistant Examiner—Kevin Hurley
Attorney, Agent, or Firm—Fish & Richardson

[57] ABSTRACT

In performing slip control such as traction control or ABS control, a control degree for slip control is changed in accordance with a temperature of outside air, or outside air temperature. The slip control system enhances response to slip control on a road surface having a lower road surface friction coefficient $\mu$, or a slippery road, and prevent a frequent execution of slip control on a road surface having a higher road surface friction coefficient $\mu$, by appropriating the setting of the road surface friction coefficient $\mu$ in accordance with the outside air temperature. A mode of changing the control degree for slip control includes, for example, a change of the condition for starting slip control, a change of a target value for slip control, and a change of an initial value of the road surface friction coefficient $\mu$, in accordance with the outside air temperature.

32 Claims, 11 Drawing Sheets

FIG.4
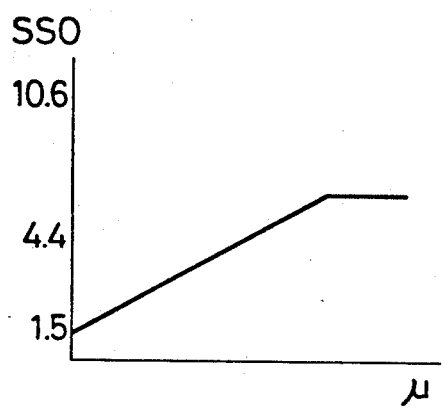
FIG.5
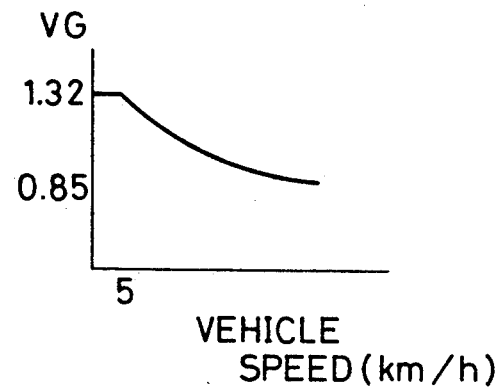
FIG.6
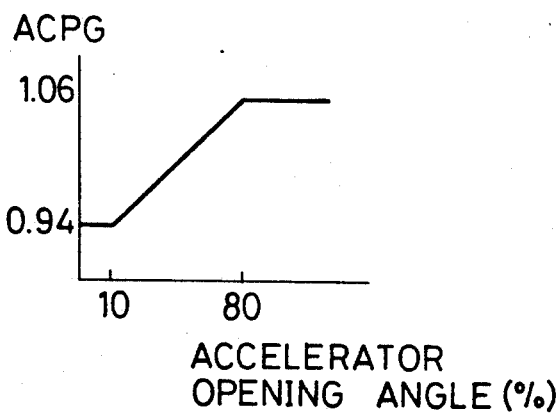
FIG.7
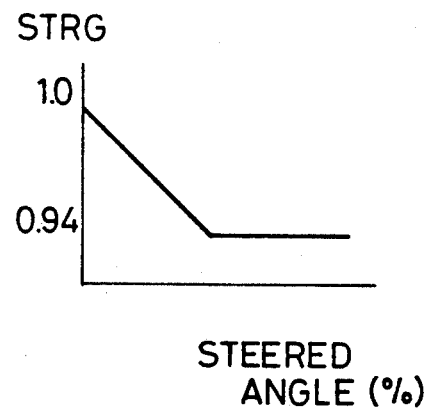
FIG.8
| MODES | MODEG |
|---|---|
| SPORT | 1.2 |
| NORMAL | 1.0 | ns
SLIP CONTROL SYSTEM FOR AUTOMOTIVE VEHICLE

BACKGROUND OF THE INVENTION

1. Field of the Invention

The present invention relates to a slip control system for an automotive vehicle and, more particularly, to a slip control system for an automotive vehicle so adapted as to suppress a slip or spin of a wheel against a road surface in accordance with the driving state of the automotive vehicle body.

2. Description of Related Art

Heretofore, as disclosed in Japanese Patent Laid-open (kokai) Publication No. 251,268/1987, there is known a slip control system having a traction control function for suppressing a slip or spin of the driven wheel by recovering a grip of the driven wheel by reducing output of the engine as well as by braking the driven wheel when a slip value of the driven wheel against a road surface reaches a predetermined value or higher during accelerating the automotive vehicle body.

Japanese Patent Laid-open (kokai) Publication No. 255,558/1985 discloses a slip control system (an ABS control unit) equipped with an anti-skid control function for controlling a braking pressure to be so applied to each of the wheels as to provide an appropriate braking force by preventing the wheels from being locked during operation of the brakes.

In executing control over a slip or spin of the driven wheel of the automotive vehicle on a road surface, the control state varies to a great extent with a road surface friction coefficient $\mu$. For instance, when the automotive vehicle runs on a road having a small road surface friction coefficient $\mu$, such as a frozen road, a friction resistance of the wheel acting upon such a road during driving the automotive vehicle on the road is extremely small so that the behavior of the wheel varies to a great extent during driving on the road than during driving on ordinary road, when the wheel is braked by the slip control system.

It is desired, therefore, that the control state of the wheel by the slip control system is varied with a road surface friction coefficient $\mu$. However, it is impossible to determine an accurate road surface friction coefficient $\mu$ at the time of start of slip control so that the slip control cannot be performed in an appropriate way so as to correspond to the state of a road surface. In other words, the road surface friction coefficient $\mu$ is usually calculated in accordance with a slip value of the driven wheel changing by executing the slip control so that no accurate road surface friction coefficient $\mu$ at the time of start of slip control can be determined. Therefore, conventional slip control system is so arranged as to determine the timing of start of the slip control in accordance with an initial value of an estimated road surface friction coefficient $\mu$ to be employed at the time of start of slip control, an initial value being set to a maximum value. Hence, the timing of starting the slip control cannot be determined in an accurate way during driving on a road having a low surface temperature, so that a response to the control is made poor.

In order to improve the response to the control during driving the automotive vehicle on a road having a low road surface temperature, it is considered to set an initial value of an estimated road surface friction coefficient $\mu$ to a small value corresponding to the low road surface friction coefficient $\mu$. In this case, however, the problem may arise that the behavior of the automotive vehicle becomes unstable as a result of frequent execution of slip control during driving the automotive vehicle on ordinary road other than a frozen road or the like.

SUMMARY OF THE INVENTION

The present invention has been performed in order to solve the aforesaid problems and the object of the present invention is to provide a slip control system for an automotive vehicle, so adapted as to perform rapid and appropriate slip control in accordance with road surface friction coefficient $\mu$ to thereby improve response to control during driving the automotive vehicle on such a road as having a low road surface friction coefficient $\mu$, such as a frozen road, and consequently to improve stability in drivabability of the automotive vehicle. Further, the slip control system according to the present invention can stabilize the behavior of the automotive vehicle body during driving on an ordinary road by preventing the slip control from being executed frequently.

In order to achieve the aforesaid object, the present invention is so constructed as to alter a degree of slip control in accordance with the outside air temperature exerting a big influence upon the road surface friction coefficient $\mu$. For example, a mode of altering the degree of slip control is to alter an initial value of the road surface friction coefficient $\mu$. More specifically, the initial value of the road surface friction coefficient $\mu$ is set to a smaller value when the outside air temperature is lower than when it is higher. Another mode of altering the degree of slip control is to alter a reference value as a threshold value for determinig the condition for starting the slip control. In this case, the reference value is set to a smaller value when the outside air temperature is lower than when it is higher, whereby the slip control can be readily started. A further mode of altering the degree of slip control is to alter a target value for slip control in such a manner that the target value is set smaller when the outside air temperature is lower as compared with a higher outside air temperature.

The aforesaid arrangement for the present invention can converge a slip of the driven wheel of the automotive vehicle rapidly by starting the slip control earlier or by performing slip control by the large degree of slip control, where there is the risk of causing freezing a road surface due to a low outside air temperature. On the contrary, when the outside air temperature is high, the start of the slip control is delayed or the degree of slip control is rendered smaller, thereby suppressing undesirable influences of slip control, such as worsening acceleration in the event of traction control or increasing braking distance in the event of ABS control.

The present invention consists of a slip control system so adapted as to prevent a slip of the wheel against a road surface, comprising outside air temperature sensing means for sensing an outside air temperature; and control degree altering means for altering a degree of control so as to increase the degree of control for slip control when the outside air temperature sensed by the outside air temperature sensing means is higher as compared with when the outside air temperature is lower.

Other objects, features and advantages of the present invention will become apparent in the course of the description of the preferred embodiments, which follows, with reference to the accompanying drawings.

BRIEF DESCRIPTION OF THE DRAWINGS

FIG. 4 is a map showing a basic slip value for slip control set by using a road surface friction coefficient $\mu$ as a parameter.

FIG. 5 is a map showing a gain coefficient set by using a vehicle speed as a parameter.

FIG. 6 is a map showing a gain coefficient set by using an accelerator opening angle as a parameter.

FIG. 7 is a map showing a gain coefficient set by using a steered angle of a steering wheel as a parameter.

FIG. 8 is a table showing a gain coefficient corresponding to a driving mode.

DESCRIPTION OF THE PREFERRED EMBODIMENTS

Figure 1:
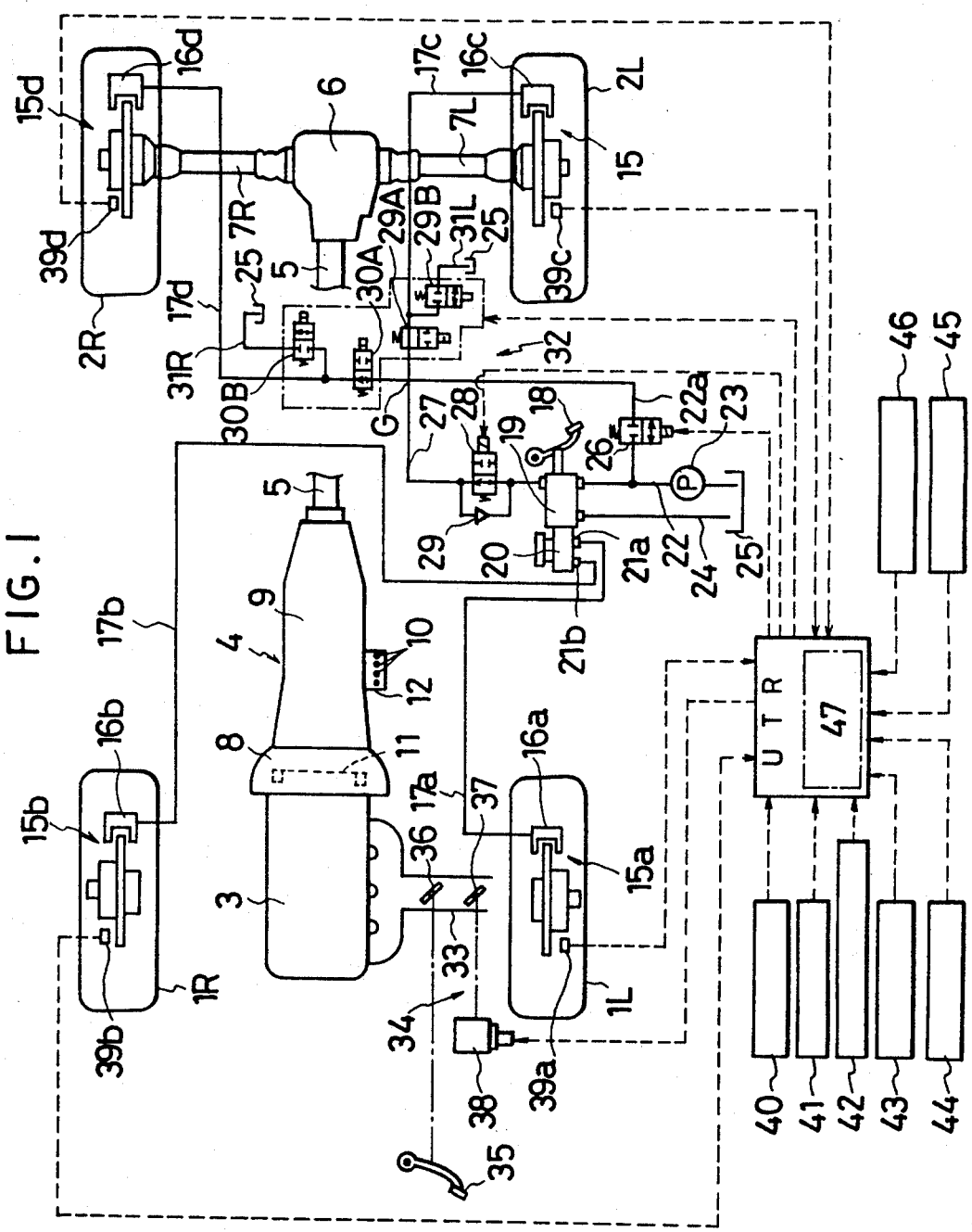
FIG. 1 is a diagrammatic representation of an overall system according to an embodiment of the slip control system according to the present invention.

FIG. 1 shows an automotive with a slip control system according to an embodiment of the present invention. The slip control system comprises an output control means for controlling output of an engine for executing traction control and a braking force control means for controlling a braking force against driven wheels. The automotive vehicle has left-hand and right-hand front wheels 1L and 1R as undriven wheels and left-hand and right-hand rear wheels 2L and 2R as driving wheels, respectively, and a driving force of the engine 3 is transmitted through an automatic transmission 4, a propeller shaft 5, a differential 6 and left-hand and right-hand axles 7L and 7R to the left-hand and right-hand rear wheels 2L and 2R, respectively.

The automatic transmission 4 comprises a torque converter 8 and a multistage shift gear mechanism 9, and a shift is performed by altering a combination of actuation with deenergization of a plurality of solenoids 10 incorporated in a hydraulic pressure circuit of the multistage shift gear mechanism 9. The torque converter 8 has a lockup clutch 11 of a hydraulically operative type and is so constructed as to be coupled or uncoupled by shifting solenoids 12 incorporated in the hydraulic pressure circuit between actuation and deenergization.

The solenoids 10 and 12 are controlled in response to control signals generated from a control unit for shift control (not shown). The control unit is so constructed as to generate to the solenoids 10 and 12 control signals for executing a predetermined shift control and a lockup control on the basis of shift characteristic and lockup characteristic preset in per se known manner and in response to signals sensed by and generated from a throttle opening angle sensor and a vehicle speed sensor.

At the left-hand and right-hand front wheels 1L and 1R and the left-hand and right-hand rear wheels 2L and 2R are disposed respective brakes 15a, 15b, 15c and 15d, and pipings 17a, 17b, 17c and 17d for supplying braking pressure are connected to calipers 16a, 16b, 16c and 16d of the respective brakes 15a, 15b, 15c and 15d. A pressure for depressing a braking pedal 18 is amplified by a servo unit 19 of a liquid pressure servo type and then transmitted to a master cylinder 20. A braking liquid pressure is supplied to the caliper 16 of the left-hand front wheel 1L through the respective piping 17a from a first discharge outlet 21a of the master cylinder 20, and a braking liquid pressure is supplied to the respective caliper 16b of the right-hand front wheel 16b through the respective piping 17b from a second discharge outlet 21b of the master cylinder 20.

To the servo unit 19 is supplied a liquid pressure from a pump 23 through a piping 22, and a surplus liquid pressure is returned to a reserve tank 25 through a return piping 24. A branch tube 22a branched from the piping 22 is connected to a joint portion G with a piping 27, as will be described hereinafter, and a switch valve 26 of electromagnetic type is mounted to the branch tube 22a. A servo liquid pressure created within the servo unit 19 is supplied to the joint portion G through the piping 27 which in turn is provided with a switch valve 28 of electromagnetic type. The piping 27 also has a one-way valve 29 disposed in parallel to the switch valve 28 of electromagnetic type so as to accept a flow of a braking oil toward the joint portion G and to suppress the flow thereof in the opposite direction.

To the joint portion G are connected brake pipings 17c and 17d for the left-hand and right-hand rear wheels and the pipings 17c and 17d are provided with switch valves 29A and 30A of electromagnetic type, respectively. A relief passage 31L with a switch valve 29B of eletromagnetic type mounted thereto is disposed on the downstream side of a portion at which the switch valve 29A of electromagnetic type is mounted. On the other hand, a relief passage 31R having a switch valve 30B mounted thereto is disposed on the downstream side of a portion at which the switch valve 30A of electromagnetic type is mounted.

The switch valves 26, 28, 29A, 29B, 30A and 30B constitute a braking force control means 32 for the left-hand and right-hand rear wheels 2L and 2R, respectively, and they are controlled by a control unit UTR for slip control. As shown in the drawing, when no slip control is executed, the switch valve 28 is closed while the switch valve 28 is opened as well as the switch valves 29A and 30A are opened. This arrangement for the switch valves allows the braking liquid pressure to be supplied to the brakes 15a and 15b for the front wheels from the master cylinder 20, when the braking pedal 18 is depressed, while the servo liquid pressure from the servo unit 19 is supplied as a braking liquid pressure to the brakes 15c and 15d for the rear wheels.

On the other hand, when slip control is to be executed over the left-hand and right-hand rear wheels 2L and 2R, respectively, the switch valve 28 is closed in response to control signal from the control unit UTR, while the switch valve 26 is opened. The braking liquid pressure is retained, elevated or decreased by executing duty control over the switch valves 29A and 29B as well as 30A and 30B. In other words, when the switch valves 29A, 29B, 30A and 30B are closed in a state that the switch valve 26 is open, the braking liquid pressure is retained. The braking liquid pressure is elevated when the switch valves 29A and 30A are opened and the switch valves 29B and 30B are closed, while the braking liquid pressure is decreased when the switch valves 29A and 30A are closed and the switch valves 29B and 30B are opened. And the braking liquid pressure passed through the branch tube 22a is so arranged as not to work as a reaction force for the braking pedal 18 by bypassing the one-way valve 29.

When the braking pedal 18 is depressed while the slip control is being performed by the braking force control means 32, the braking liquid pressure from the servo unit 19 is supplied to the brakes 15c and 15d for the rear wheels through the one-way valve 29.

The control unit UTR for the slip control executes the braking force control by applying the braking force to the rear wheels 2L and 2R in the manner as described hereinabove in order to suppress a slip by reducing torque to be applied to the rear wheels 2L and 2R during acceleration of the automotive vehicle and, at the same time, executes the output control for reducing the torque for driving the engine 3. The output control is executed by a sub-throttle valve opening angle adjusting mechanism 34 disposed at an air intake passage 33 of the engine 3. The sub-throttle valve opening angle adjusting mechanism 34 comprises a sub-throttle valve 37 so disposed on the upstream side of a throttle valve 36 as to be opened or closed by an accelerator pedal 35, and an an actuator 38 for driving the sub-throttle valve 37. The output of the engine 3 is controlled by opening or closing the sub-throttle valve 37 in response to control signals generated by the control unit UTR to the actuator 38.

Into the control unit UTR for the slip control are inputted output signals generated by wheel speed sensors 39a, 39b, 39c and 39d for sensing rotational speeds of the respective wheels 1L, 1R, 2L and 2R, a throttle valve sensor 40 for sensing an opening angle of the throttle valve 36, a vehicle speed sensor 41 for sensing a vehicle speed of the automotive vehicle, a sub-throttle valve sensor 42 for sensing an opening angle of the sub-throttle valve 37, a steered angle sensor 43 for sensing a steered angle of a steering wheel, a switch 44 for use in manually setting driving mode, etc., a brake sensor 45 for sensing the depressing of the braking pedal 18, and an outside air temperature sensor 46 for sensing an outside air temperature.

Figure 2:
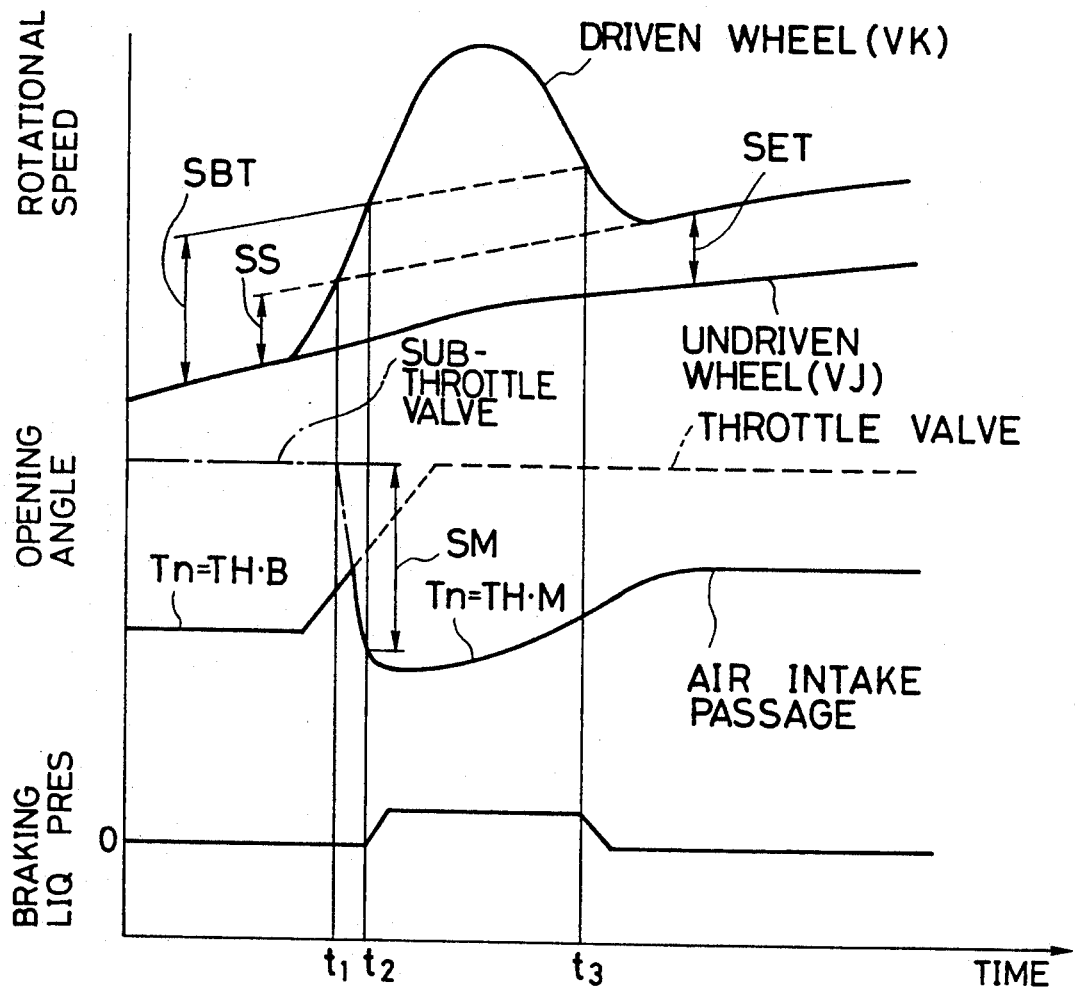
FIG. 2 is a time chart showing an outline of slip control.

The control unit UTR calculates a slip value of the rear wheels 2L and 2R in response to the output signals from the sensors and the switch and executes slip control comprising a braking force control for the rear wheels 2L and 2R and an output control for the engine 3 in response to the calculation results, as shown in FIG. 2. A control status altering means 47 built in the control unit UTR is arranged to alter a control status of an output control means consisting of the sub-throttle valve opening angle adjusting mechanism 34 and the braking force control means 32 in a manner as will be described hereinafter, in response to the signal generated by the outside air temperature sensor 46, when it is confirmed that the outside air temperature is so sensed as to be equal to or lower than a predetermined reference temperature.

As shown in FIG. 2, reference symbol SS denotes a reference value at the time of starting the slip control for the rear wheels 2L and 2R, namely, a threshold value of a slip value functioning as a reference for decision as to the timing of starting the slip control. During acceleration of the automotive vehicle, in a region where the slip value of the rear wheels 2L and 2R reaches the point $t_1$ at which it increases to a value above the reference value SS, the sub-throttle valve 37 is maintained in such a state that it is opened to the maximum extent and an opening angle Tn of the air intake passage 33 is set in accordance with the opening angle of the throttle valve 36. In other words, the opening angle Tn of the air intake passage 33 is set in accordance with an opening angle TH·B of the throttle valve 36 so operated as to be opened or closed in response to a value given by depressing the accelerator pedal 35, thereby executing the output control over the engine 3.

At the point $t_1$ at which the slip value is increased in accordance with an increase in the rotational speed of each of the rear wheels 2L and 2R and it reaches the reference value SS or greater at the time of start of the slip control, the actuator 38 is operated to execute feedforward control so as to decrease the opening angle of the sub-throttle vale 37 to an initial set value SM as will be described hereinafter. As a result, the opening angle of the sub-throttle vale 37 is allowed to become smaller than the opening angle of the throttle valve 36 and the opening angle Tn of the air take passage 33 is set in accordance with the opening angle of the sub-throttle valve 37. Thereafter, the opening angle TH·M of the sub-throttle vale 37 is subjected to feedback control so as to allow the slip value of the rear wheels 2L and 2R to reach a target value SET for the engine output control in a manner as will be described hereinafter.

At the point $t_2$ at which the slip value of the rear wheels 2L and 2R is further increased from the point $t_1$ at which the slip control starts and it exceeds a target value SBT for braking force control as will be described hereinafter, the braking liquid pressure is supplied to the brakes 15c and 15d of the respective rear wheels 2L and 2R to subject the braking force for the rear wheels 2L and 2R to feedback control up to the point $t_3$ at which the slip value of the rear wheels 2L and 2R becomes above the target value SBT.

Figure 3:
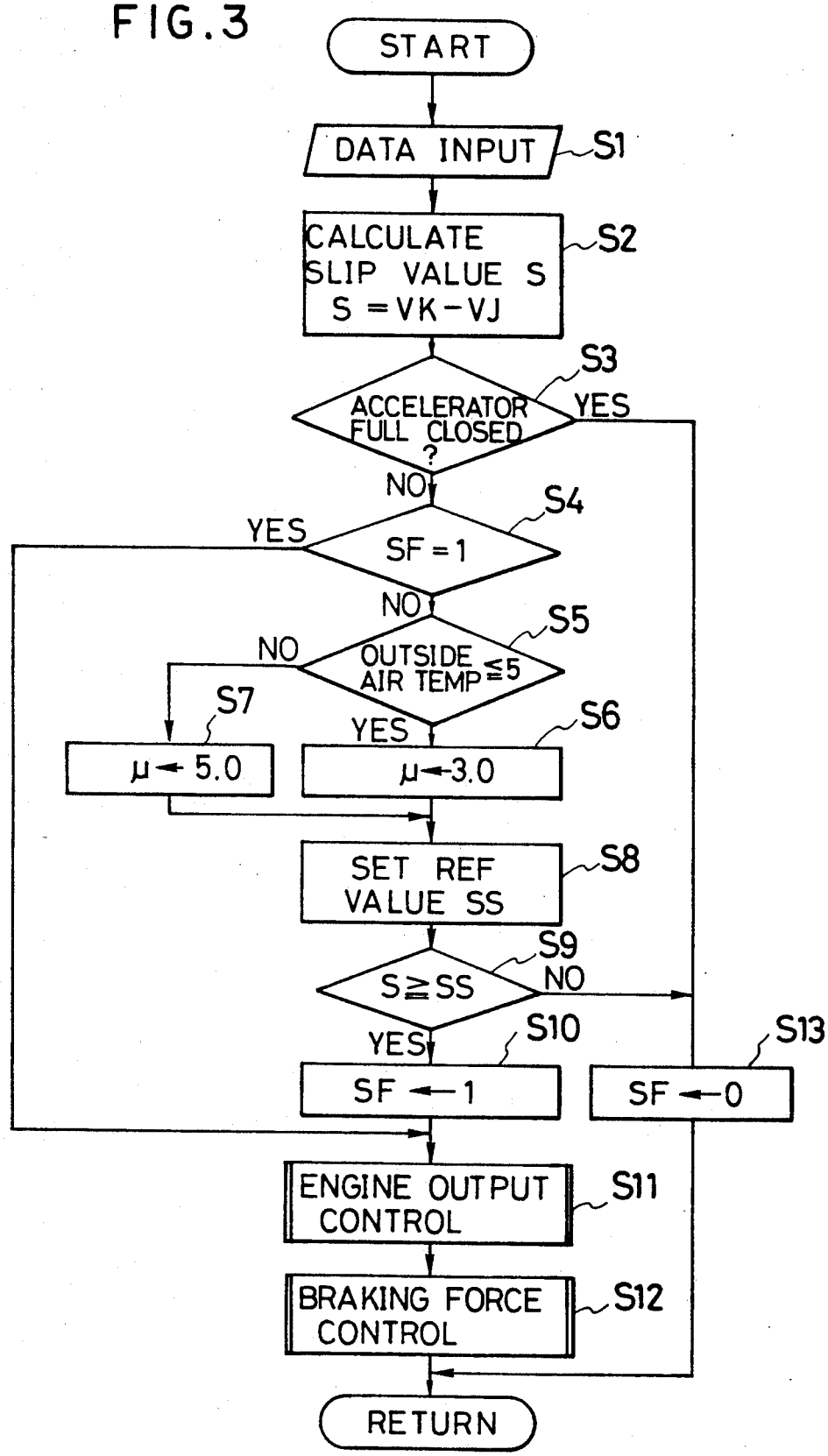
FIG. 3 is a flow chart showing a control operation of the slip control system according to the present invention.

Description will be made of detail of the slip control by the control unit UTR with reference to the flow chart as shown in FIG. 3.

After the control operation has started, each of data is inputted on the basis of signals from each of the sensors and the switch at step S1. Then, at step S2, a slip value S for the rear wheels 2L and 2R is calculated by subtracting a rotational speed VJ for the front wheels 1L and 1R as undriven wheels from a rotational speed VK for the rear wheels 2L and 2R as driven wheels. In calculating the slip value S, an average of the rotational speeds of the left-hand and right-hand front wheels 1L and 1R is employed as the rotational speed VJ for the undriven wheels and either of the rotational speed of the left-hand rear wheel 2L or that of the right-hand rear wheel 2R, whichever larger, or an individual rotational speed of each of the left-hand and right-hand rear wheels 2L and 2R is employed as the rotational speed VK of the driven wheel.

Then, at step S3, a decision is made to determine if the accelerator is full closed. When the result of decision at step S3 indicates that the accelerator is not full closed and it is confirmed that the automotive vehicle is accelerating at a predetermined rate, then the program flow goes to step S4 at which it is decided to determine if a slip flag SF is set to 1, namely, if the slip control is currently in process. As the result of decision at step S4, it is confirmed that no slip control is executed, the program flow goes to step S5 at which a decision is further made to determine if the outside air temperature detected by the outside air temperature sensor 46 is as equal to or lower than 5° C. When it is confirmed by decision at step S5 that the outside air temperature is equal to or lower than 5° C., the program flow goes to step S6 at which an initial value of an estimated road surface friction coefficient $\mu$, namely, a value of road surface friction coefficient $\mu$ at which the slip control is allowed to start, is set to 3.0 that corresponds to a middle degree of road surface friction coefficient $\mu$. When it is decided at step S5 that the outside air temperature is higher than 5° C., then the program flow goes to step S7 at which the initial value of the estimated road surface friction coefficient $\mu$ is set to 5.0 that corresponds to a high degree of road surface friction coefficient $\mu$.

Thereafter, at step S8, there is set a reference value SS at the time of start of the slip control, namely, a threshold value functioning as a reference to decision to determine if the slip control is to be started. For example, as shown in FIG. 4, a basic slip value SS0 corresponding to the initial value of the estimated road surface friction coefficient $\mu$ is read from a map of the basic slip value SS0 for slip control, prestored by using the road surface friction coefficient $\mu$ as a parameter. Then, each of the gain coefficients is read from a map of gain coefficients VG stored by using a vehicle speed as a parameter as shown in FIG. 5, from a map of gain coefficients ACPG stored by using an accelerator opening degree as a parameter as shown in FIG. 6, from a map of gain coefficients STRG stored by using a steered angle as a parameter as shown in FIG. 7, and from a table of gain coefficients MODEG corresponding to the driving mode selected in accordance with the operation of a switch by the operator as shown in FIG. 8. Then, each of the resulting gain coefficients is multiplied by the basic slip value SS0, thereby giving the reference value SS at the time of start of the slip control.

Then, at step S9, a decision is made to determine if the slip value S for the rear wheels 2L and 2R is equal to or larger than the reference value SS at the time of start of the slip control. When the result of decision at step S9 indicates that the slip value S is equal to or larger than the reference value SS, then the program flow goes to step S10 at which the slip flag SF is set to one, followed by proceeding to step S11 at which the control over the output of the engine 3 is executed and then to step S12 at which the control over the braking force for the rear wheels 2L and 2R is executed.

When it is decided at step S4 that the slip flag SF is set to one and it is confirmed that the slip control is currently under way, then the program flow goes to step S11 at which the slip control is continued. When it is decided at step S3 that the accelerator is full closed or it is decided at step S9 that the slip value S for the rear wheels 2L and 2R is smaller than the reference value SS at the time of start of the slip control and when it is confirmed that no slip control is required to be executed, then the program flow goes to step S13 at which the slip flag is reset to zero, followed by the return of the flow.

Figure 9:
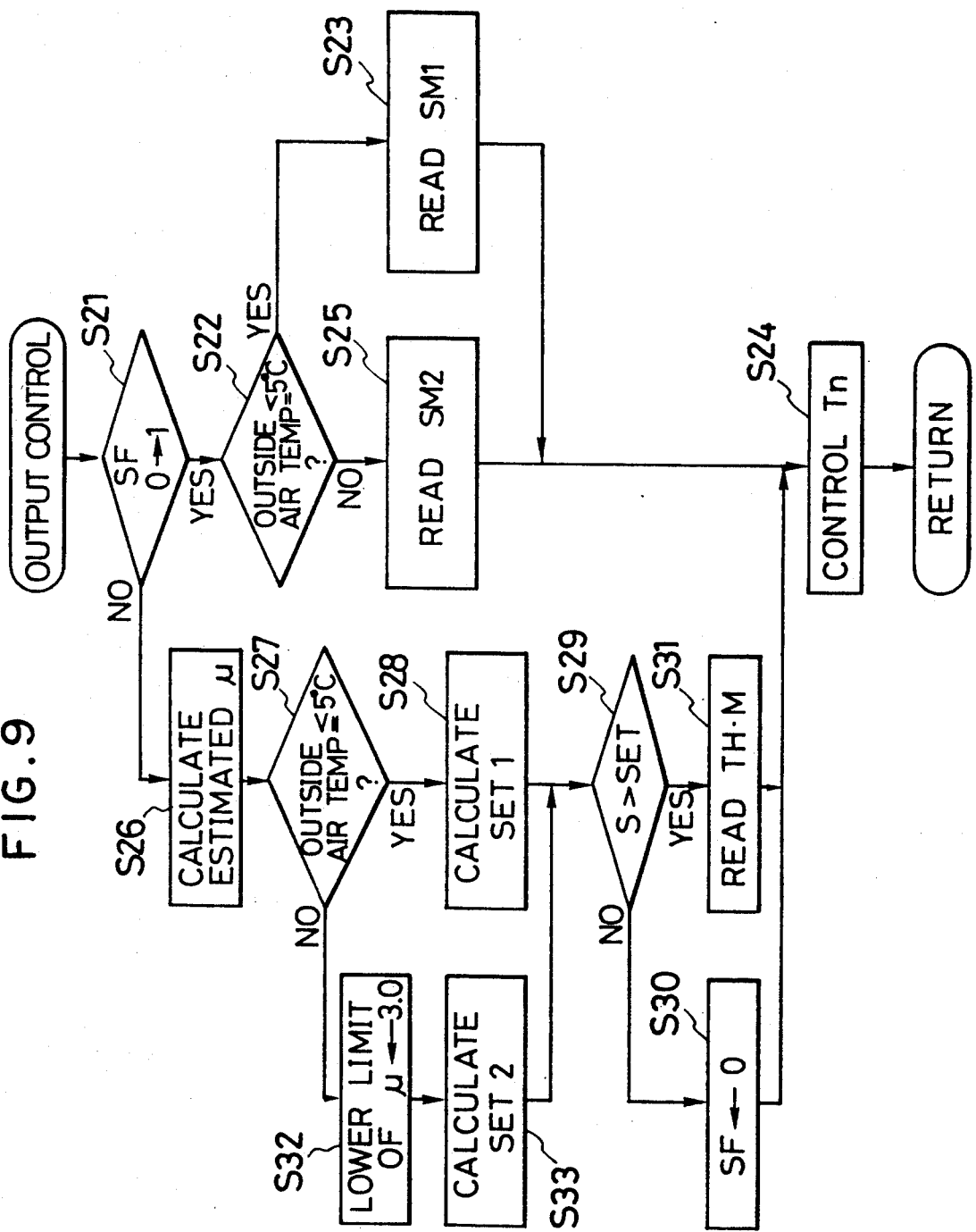
FIG. 9 is a flow chart showing operation of control over output of the engine.

Description will now be made of the control over the output of the engine with reference to a flow chart as shown in FIG. 9.

First, at step S21, a decision is made to determine if the slip flag has been changed from zero to one at the present time, namely, if the present time is the point $t_1$ at the time of start of the slip control as shown in FIG. 2. If the result of decision at step S21 indicates that the present time is the point $t_1$, then the program flow goes to step S22 at which a decision is made to determine if the outside air temperature is equal to or lower than 5° C.

When it is confirmed as a result of decision at step S22 that the outside air temperature is equal to or lower than 5° C., then the program flow goes to step S23 at which an initial set value SM1 for the sub-throttle valve 37 preset for driving on road having a lower surface temperature is read, followed by proceeding to step S23 at which the actuator 38 is operated in accordance with the initial set value SM1, thereby controlling the opening angle Tn for the air intake passage 33 by reducing the opening angle of the sub-throttle valve 37. When it is confirmed as a result of decision at step S22 that the outside air temperature is higher than 5° C., then the program flow goes to step S25 at which a present initial value SM2 for the sub-throttle valve 37 is read for driving on a road having an ordinary surface temperture, the preset initial value SM2 so preset for the opening angle of the sub-throttle valve 37 as to become larger than the preset initial value SM1 (SM2>SM1). Then, the program flow goes to step S24.

Figure 10:
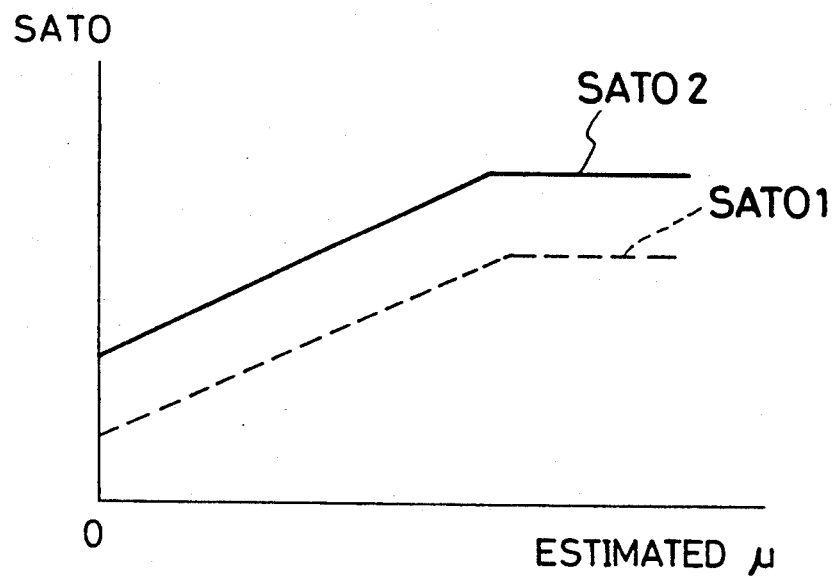
FIG. 10 is a map showing a basic slip value for output control for the engine set by using an estimated road surface friction coefficient $\mu$ as parameters.

When the result of decision at step S21 indicates that the slip flag has not been changed from zero to one and it is confirmed that the slip control has already been started, then the program flow goes to step S26 at which an estimated road surface friction coefficient $\mu$ is given from acceleration of the automotive vehicle body or the like at the time of the slip control, followed by proceeding to step S27 at which a decision is made to determine if the outside air temperature is equal to or lower than 5° C. When it is confirmed as the result of decision at step S27 that the outside air temperature is equal to or lower than 5° C., then the program flow goes to step S28 at which there is given a target value SET1 for engine output control at the time of driving on a road having a lower surface temperature. In other words, the target value SET1 is given by reading a basic slip value STA01, which is smaller than the other, from a map of two kinds of basic slip values STA0 for engine output control, prestored by using the estimated road surface friction coefficient $\mu$ as a parameter, as shown in FIG. 10, and by multiplying the basic slip value STA01 by each of the gain coefficients as shown in FIGS. 5 to 8.

Then, at step S29, a decision is made to determine if the slip value S for the rear wheels 2L and 2R is larger than a target value SET corresponding to the target value SET1 for engine output control at the time of driving on a road having a lower surface temperature. When the result of decision at step S29 indicates that the slip value S is equal to or smaller than the target value SET, then the program flow goes to step S30 at which the slip flag SF is reset to zero and the slip control is finished, followed by proceeding to step S24.

Figure 11:
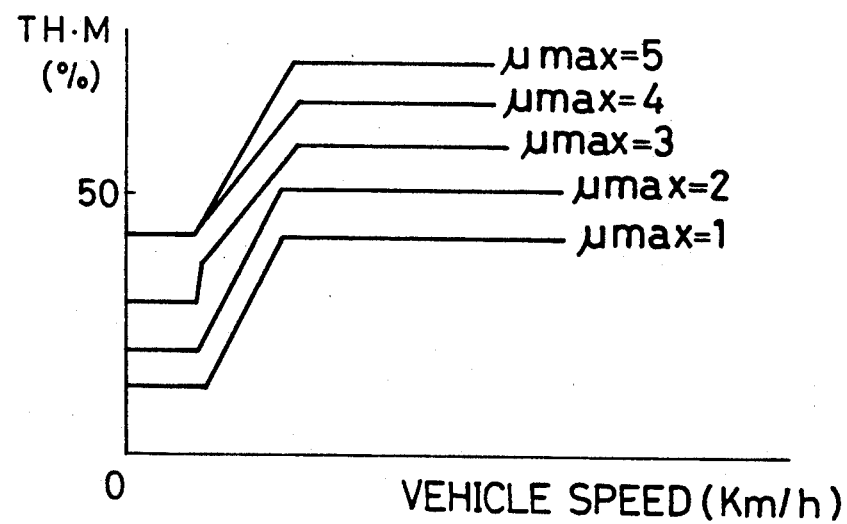
FIG. 11 is a map showing a sub-throttle opening angle set by using a vehicle speed and a road surface friction coefficient $\mu$.

When it is decided at step S29 that the slip value S for the rear wheels 2L and 2R is larger than the target value SET, then the program flow goes to step S31 at which there is read an opening angle TH·M of the sub-throttle valve 37 corresponding to the driving status of the automotive vehicle from a map set for opening angles for the sub-throttle valve by using vehicle speeds and road surface friction coefficients $\mu$ as parameters as shown in FIG. 11, that is, an amount of the actuator 38 required to be operated so as to cause the slip value S to reach a value equal to or lower than the target value SET during ordinary driving, followed by proceeding to step S24 at which the actuator 38 is operated to control the opening angle Tn for the air intake passage 33.

As a result of decision at step S27, it is confirmed that the outside air temperature is higher than 5° C., then the program flow goes to step S32 at which a lower limit of the estimated road surface friction coefficient $\mu$ is set to 3.0. In other words, when it is decided in this case that the road surface does not have such a low road surface friction coefficient $\mu$ as a frozen road surface or the like and the estimated road surface friction coefficient $\mu$ has been found to be equal to or lower than 3.0, then the lower limit value is set to 3.0. Thereafter, at step S33, a basic slip value STA02 corresponding to the estimated road surface friction coefficient $\mu$ is read from the map as shown in FIG. 10 and this value is then multiplied by each of the gain coefficients, thereby giving a target value SET2 for ordinary driving, that is, a value larger than the target value SET1 for driving on a road having a lower surface temperature, followed by proceeding to step S29.

Figure 12:
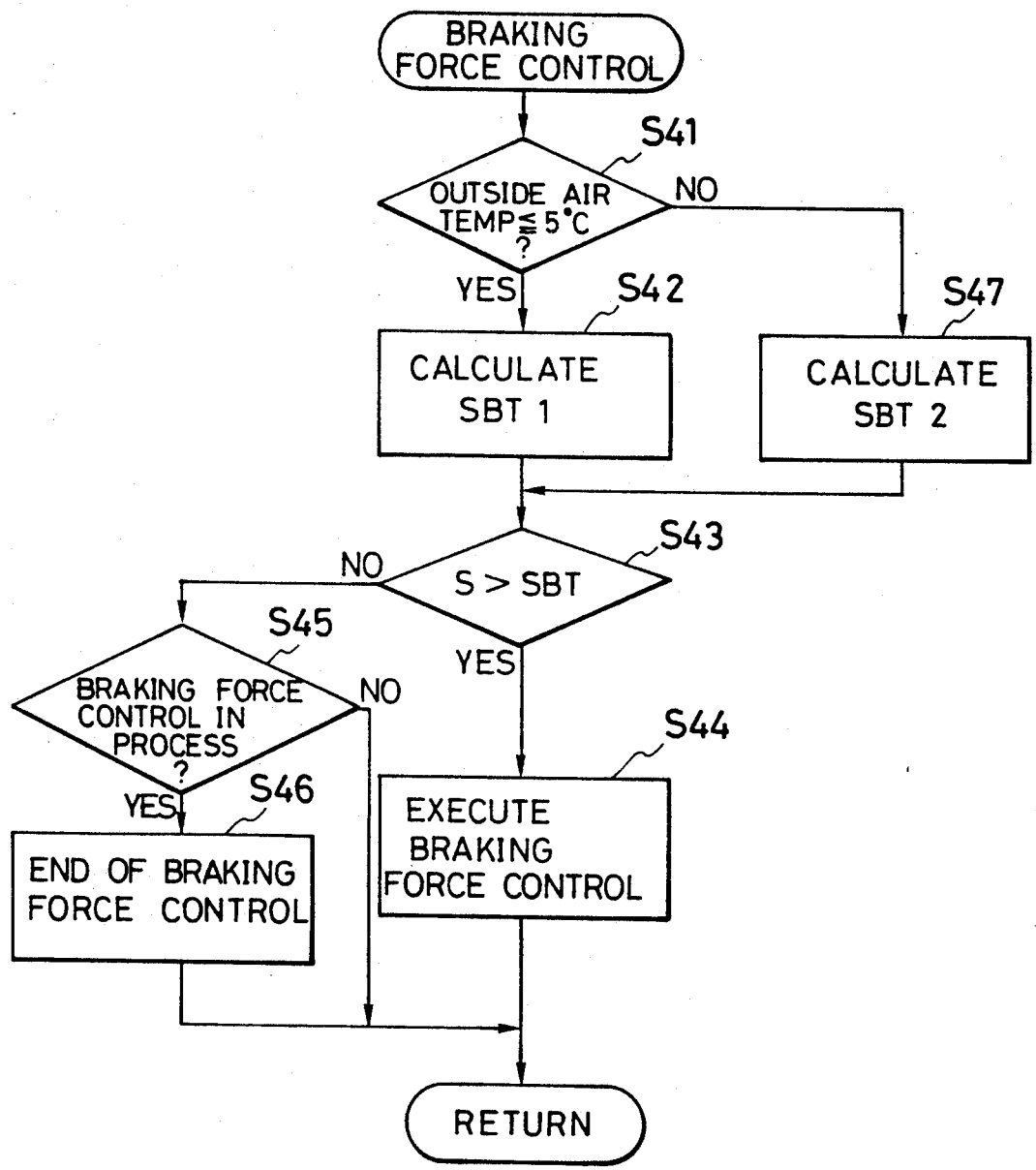
FIG. 12 is a flow chart showing operation of control over braking force.

Description will then be made of control over the braking force for the rear wheels 2L and 2R with reference to the flow chart as shown in FIG. 12.

Figure 13:
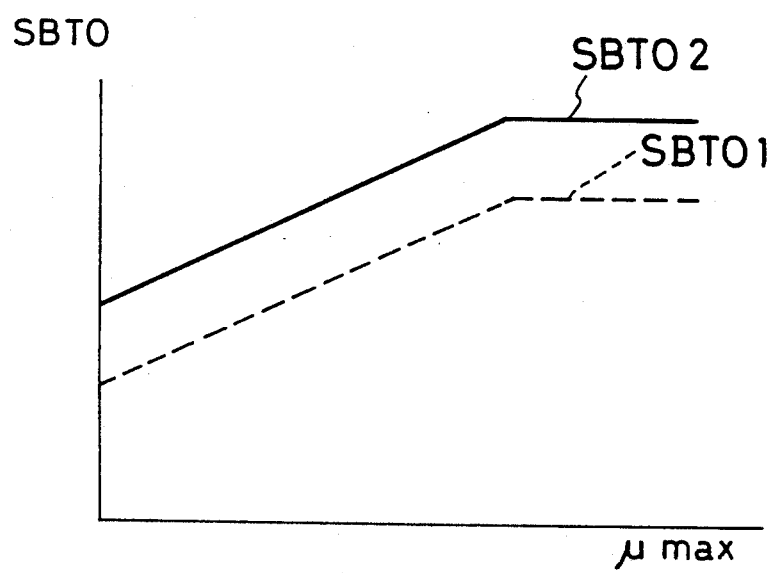
FIG. 13 is a map showing a basic control value for braking force control set by using the road surface friction coefficient $\mu$ as a parameter.

After this braking force control has been started, the program flow goes to step S41 at which a decision is made to determine if the outside air temperature is equal to or lower than 5° C. When it is confirmed as the result of decision at step S41 that the outside air temperature is equal to or lower than 5° C., then the program flow goes to step S42 at which there is given a target value SBT1 for braking force control during driving on a road having a lower surface temperature. More specifically, the basic slip value STB01, which is smaller than the other, is read from a map indicating two kinds of basic slip values STB0 for braking force control prestored by using the estimated road surface friction coefficients $\mu$ as a parameter, as shown in FIG. 13. Then, the resulting basic slip value is multiplied by each of the gain coefficients as shown in FIGS. 5 to 8, thereby giving the target value SBT1 for braking force control at the time of driving on road having a lower surface temperature.

Then, at step S43, a decision is made to determine if the slip value S for the rear wheels 2L and 2R is larger than the target value SBT corresponding to the target value SBT1 at the time of driving on road having a lower surface temperature. When it is decided at step S43 that the slip value S is larger than the target value SBT, then the program flow goes to step S44 at which the control over braking force is executed in order to reduce the slip value S to a value equal to or lower than the target value SBT.

When it is decided at step S43 that the slip value S is equal to or lower than the target value SBT, then the program flow goes to step S45 at which a decision is made to determine if the control over braking force is currently under way. If the result of decision at step S45 indicates that the braking force control is currently in process, the braking force control is finished at step S46 by gradually reducing the braking force. If the result of decision at step S45 indicates that the braking force control is not executed at the present time, then the program flow is returned as it is.

When it is confirmed as the result of decision at step S41 that the outside air temperature is higher than 5° C., then the program flow goes to step S47 at which there is given a target value SBT2 for braking force control for ordinary driving, that is, a target value larger than the target value SBT1 during driving on a road having a lower surface temperature, followed by proceeding to step S43.

In accordance with the present invention, the slip control system with a traction control function for suppressing a slip of the driven wheel during acceleration can execute the slip control at an early stage during driving on such a road having a lower surface temperature, such as a road which might be frozen, because it can alter an initial value of the estimated road surface friction coefficient $\mu$ for driving on a road having such a lower surface temperature in accordance with the outside air temperature to a value smaller than for ordinary driving. In other words, the slip control system according to the present invention can determine the timing of starting the slip control in an appropriate way and at an early stage because a reference value for the timing of starting the slip control is set to a smaller value at the point of time of starting the slip control at which no road surface friction coefficient $\mu$ can be calculated than conventional system in which the timing of starting the slip control is determined by setting an initial value of the estimated road surface friction coefficient $\mu$ to a maximum value. Hence, the slip control system according to the present invention can improve response of the slip control by executing the slip control at an early stage during driving on such a frozen road or the like on which the driven wheels are likely to cause slipping or spinning. Further, it can prevent the slip control from being frequently executed during driving on an ordinary road surface which will not be frozen and which is unlikely to cause the driven wheels to slip or spin because the initial value of the estimated road surface friction coefficient $\mu$ is selected as a larger value during driving on such an ordinary road so as to set the reference value during the slip control to a larger value.

Also, the slip control system according to the present invention can execute the slip control in a more appropriate way by effectively suppressing a slip of the driven wheels during driving on such a road having a lower surface friction coefficient $\mu$ when the slip control is so arranged as to be executed by setting two kinds of values each for the target value SET for engine output control and for the target value SBT for braking force control to converge the slip value of the driven wheels to a constant value and further by selecting the target values SET1 and SBT1 for driving on a road having a lower surface friction coefficient $\mu$, such as frozen road or the like, smaller than the target values SET2 and SBT2 for driving on ordinary road.

In particular, as indicated in the embodiment as described hereinabove, the slip control system according to the present invention has the advantage that a slip of the driven wheels can rapidly be reduced during driving on a road having a lower road surface friction coefficient $\mu$, such as frozen road or the like, when the opening angle Tn for the air intake passage 33 is so arranged as to select a smaller initial value SM1 for driving on road having a lower surface temperature than a larger initial value SM2 for driving on road having ordinary surface temperature, when two kinds of values are provided for the initial value SM of the sub-throttle opening angle at the time of start of the slip control.

In the embodiment as described hereinabove, the reference value SS functioning as the threshold value for determining the timing for executing the traction control is so arranged as to be altered by varying the initial value of the estimated road surface friction coefficient $\mu$ at the time of start of the slip control with roads having a lower surface temperature and a higher surface temperature. It is also possible to set two different kinds of reference values as the reference value SS and to arrange for the reference value SS to be altered in accordance with the outside air temperature to a smaller value on road having a lower surface temperature than on road having a higher surface temperature. In this case, the timing for starting the slip control can be determined in an appropriate way and at an early stage, thereby improving response to the slip control during driving on a frozen road or the like which is likely to cause the driven wheels to slip or spin. Further, this arrangement can prevent the slip control from being executed frequently during driving on ordinary road which is unlikely to be frozen and which is unlikely to cause the driven wheels to slip or spin.

Although description of the aforesaid embodiment is directed to the arrangement for the control over output of the engine during the slip control executed by the output of the engine by the output control means consisting of the sub-throttle opening angle adjusting mechanism 34, an ignition timing control means of the engine 3 may be provided in addition to the sub-throttle opening angle adjusting mechanism 34. In other words, the control over output of the engine 3 during execution of the slip control may be so arranged as to be executed by determining the ignition timing in response to a signal sensed by and generated from the throttle valve sensor 40 and a signal sensed by and generated from a sensor for sensing the number of revolutions of the engine 3 and by retarding the ignition timing by generating a control signal to an igniter of the engine 3 on the basis of the ignition timing determined.

Figure 14:
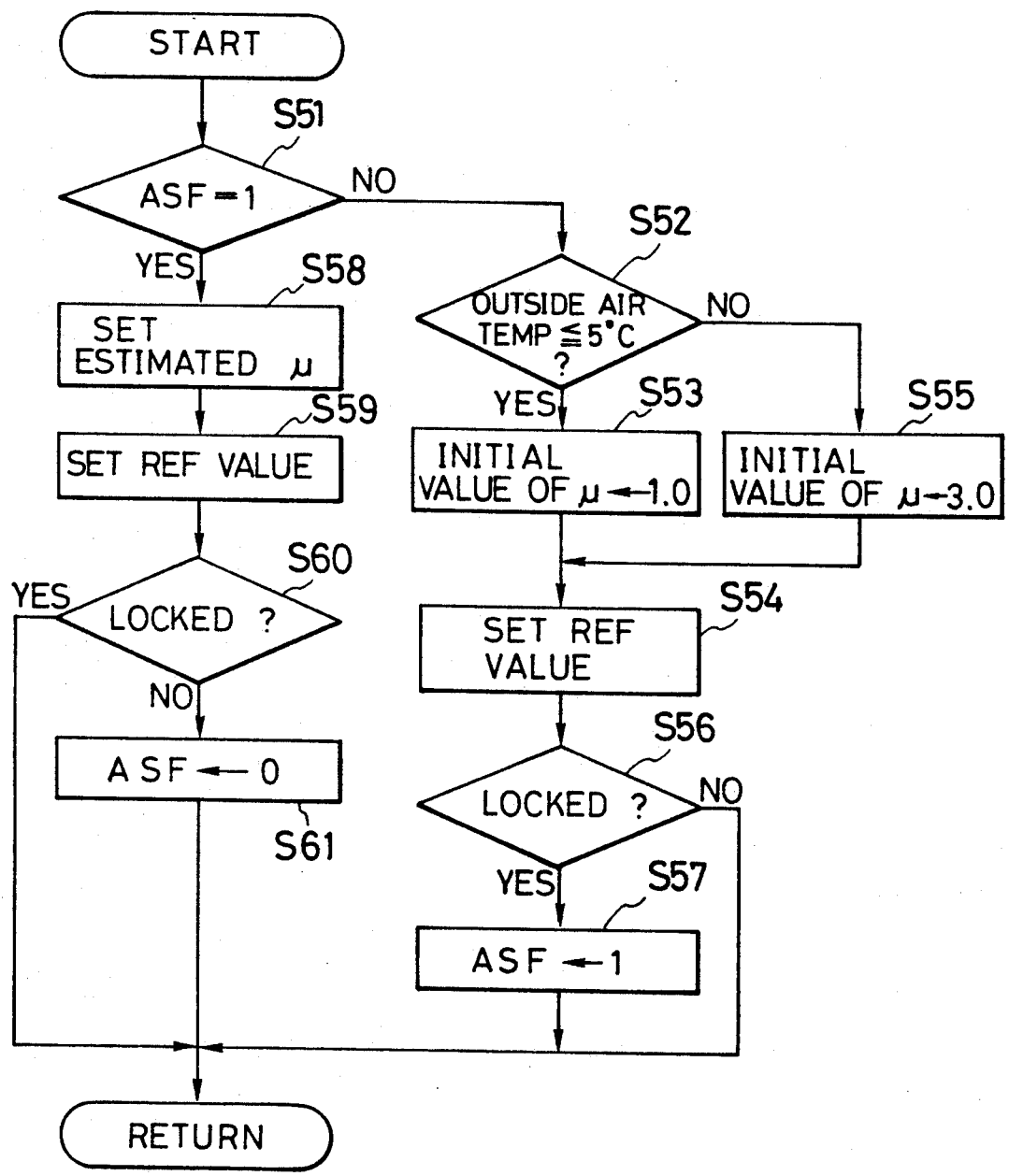
FIG. 14 is a flow chart showing operation of traction control.

It is further to be noted that the present invention is not restricted to the slip control system for executing the traction control by suppressing a slip of the driven wheel during acceleration of the automotive vehicle and it can be applied to a slip system for executing an anti-skid control for preventing the undriven and driven wheels from being locked during braking operation. More specifically, description will now be made, with reference to a flow chart as shown in FIG. 14, on the control operation when the anti-skid control is executed by the slip control system with the braking force control means for individually controlling the braking force for the front wheels 1L and 1R as the undriven wheels and for the rear wheels 2L and 2R as the driven wheels.

Figure 16:
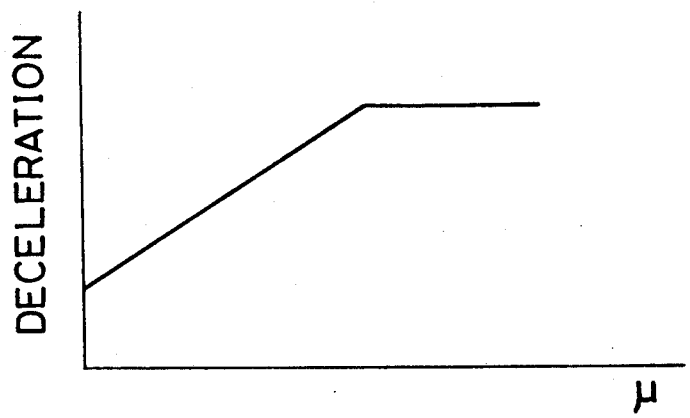
FIG. 16 is a map for giving deceleration of the wheel as a threshold value for determining the start of the ABS control on the basis of a road surface friction coefficient $\mu$.

First, at step S51, a decision is made to determine if a flag ASF indicative of execution of the slip control is set to one. When the result of decision at step S51 indicates that the flag ASF is not set to one, on the one hand, then the program flow goes to step S52 at which a decision is further made to determine if the outside air temperature is equal to or lower than 5° C. When it is confirmed by decision at step S52 that the outside air temperature is equal to or below 5° C. and the road might be frozen, then the program flow goes to step S53 at which the initial value for the estimated road surface friction coefficient $\mu$ at the time of start of the slip control is set to 1.0 that corresponds to a road having a low road surface friction coefficient $\mu$, followed by proceeding to step S54 at which there is set a reference value for deciding to determine if the slip control is to be started, that is, deceleration of the automotive vehicle functioning as a threshold value for deciding to determine if the wheel is locked is read from a map preset by using the road surface friction coefficient $\mu$ as a parameter (FIG. 16). When the result of decision at step S52 indicates that the outside air temperature is higher than 5° C. and it is thus to be decided that there is little possibility that a road surface is frozen, then the program flow goes to step S55 at which the initial value of the road surface friction coefficient $\mu$ is set to 3.0 that corresponds to a medium road surface friction coefficient $\mu$, followed by proceeding to step S54.

Thereafter, at step S56, a decision is made to determine if the wheel is locked by comparing the reference value with the deceleration of the automotive vehicle. When it is confirmed as the result of decision at step S56 that the wheel is locked, then the program flow goes to step S57 at which the flag ASF is set to 1, thereby reducing the braking pressure to be applied to the wheel and executing the slip control for releasing the locked wheel. When the result of decision at step S56 indicates that the wheel is not locked, then the program flow is returned as it is.

Figure 15:
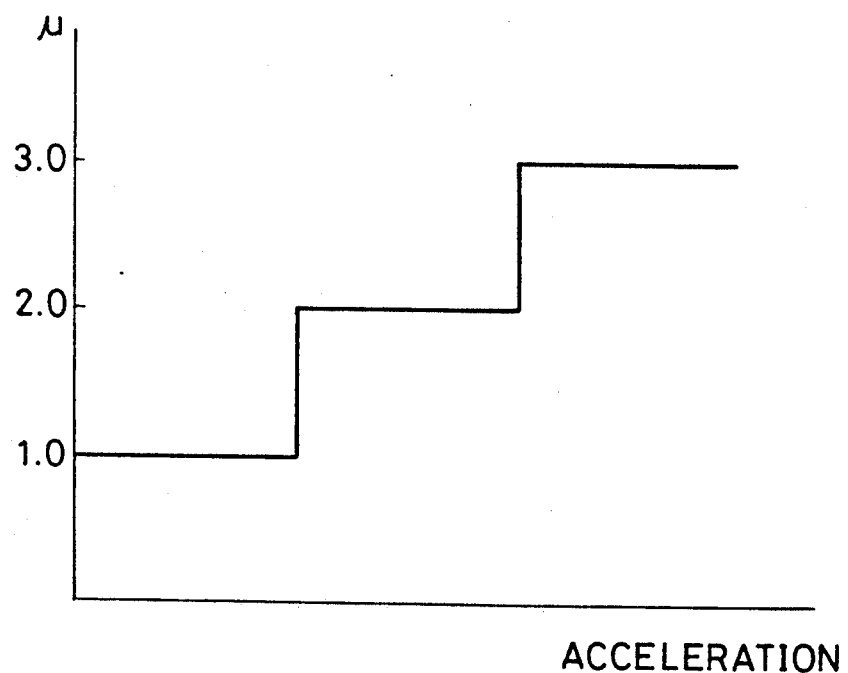
FIG. 15 is a map showing an estimated road surface friction coefficient $\mu$ during the traction control set by using acceleration of the automotive vehicle body as a parameter.

When it is decided at step S51 and it is confirmed that the slip control is currently under way, then the program flow goes to step S58 at which the estimated road surface friction coefficient $\mu$ is set in accordance with acceleration of the automotive vehicle. In other words, a value of the estimated road surface friction coefficient $\mu$ is read on the basis of a map of road surface friction coefficients $\mu$ set by using the acceleration of the automotive vehicle body as a parameter as shown in FIG. 15. Thereafter, at step S59, the reference value is set for deciding to determine if the slip control is to be started, in accordance with the estimated road surface friction coefficient $\mu$. It is preferred to set the maximum value detected during slip control as acceleration of the automotive vehicle body for estimating the road surface friction coefficient $\mu$.

Then, at step S60, a decision is made to determine if the wheel is locked on the basis of the reference value. When the result of decision at step S60 indicates that the wheel is not locked, on the one hand, then the program flow goes to step S61 at which the flag ASF is reset to zero, followed by the end of the slip control. When it is confirmed by decision at step S60 that the wheel is locked, on the other hand, the program flow is returned as it is to continue the slip control.

As described hereinabove, the slip control system with an anti-skid function for preventing the wheel from being locked during operation of the brake can set appropriately the reference value functioning as a reference for decision to determine if the slip control is to be started, when the initial value is set to a smaller value at lower temperatures than at ordinary temperatures by altering the initial value of the estimated road surface friction coefficient $\mu$ at the time of start of the slip control in accordance with the outside air temperature. In other words, whether the wheel is locked can be detected at an early stage by setting the reference value to a smaller value at lower temperature at which road surface may be likely to be frozen than at ordinary temperature, thereby effectively suppressing the wheel from being locked when the brake is operated during driving on road such as frozen road.

It is also possible to effectively prevent the wheel from being locked at the time when the automotive vehicle runs on road such as frozen road, even when decision is so arranged as to be made to determine if the wheel is locked by setting two different reference values as the reference value for deciding to determine the timing for start of the slip control and by selecting a smaller reference value during driving road having a low surface temperature when during driving on ordinary road.

As described hereinabove, the reference value for determining if the wheel slips is so arranged as to be altered to a smaller value on the basis of the initial value in response to a signal detected by the outside air temperature sensor by setting the initial value of the estimated road surface friction coefficient $\mu$ for control over a slip or spin of the wheel to a smaller value than during ordinary driving, when it is confirmed that the outside air temperature is lower than the predetermined temperature. Therefore, the slip or spin of the wheel can be detected in an appropriate way during driving a road having a lower road surface temperature, which might be frozen, thereby suppressing the slip or spin of the wheel at an early timing and improving response to the control during driving the road having a lower road surface friction coefficient $\mu$ such as a frozen road. Further, this slip control system has the advantage that the behavior of the automotive vehicle can be made stable during driving on ordinary road by preventing slip control from being executed frequently.

Also, the slip or spin of the wheel can be determined in an appropriate way in accordance with the outside air temperature even when there are preset two different kinds of reference values for determining if the wheel slips or spins and when the reference values are to be altered in accordance with the outside air temperature and the smaller reference value is selected during driving on road having a lower surface temperature as compared with during driving on road having an ordinary surface temperature.

Further, the slip control system according to the present invention has the advantage that traction control can be executed in an appropriate fashion by effectively suppressing the slip or spin of the driven wheel during running on a road having a lower road surface friction coefficient $\mu$, such as a frozen road, when there are present two different kinds of target values for converging the slip value of the driven wheel to a constant value at the time of start of the slip control during accelerating the automotive vehicle body and when the smaller target value is chosen during driving on a road having a lower road surface temperature than during driving on a road having an ordinary road surface temperature.

It is further noted that, when the slip value of the driven wheel is to be determined from the rotational speeds of the driven wheels and the undriven wheels, the slip value thereof may be determined by an appropriate formula, for example, as a ratio of the speed of the driven wheel to the speed of the undriven wheel or a ratio of the difference between the speeds of the driven and undriven wheels to the speed of the undriven wheel, as well as the difference as described hereinabove.

It is to be understood that the foregoing text and drawings relate to embodiments of the invention given by way of examples but not limitation. Various other embodiments and variants are possible within the spirit and scope of the present invention.

What is claimed is:

1. A slip control system for an automotive vehicle, comprising:
   slip detecting means for detecting wheel slip of a driven wheel relative to a surface of the road;
   torque adjusting means for adjusting torque applied to the wheel by adjusting at least one of engine output and braking force applied to the wheel;
   slip control means for controlling said torque adjusting means so as to suppress the wheel slip detected by said slip detecting means;
   outside air temperature sensing means for sensing outside air temperature; and
   control degree altering means for altering a control degree for slip control to a greater extent when the outside air temperature sensed by said outside air temperature sensing means is lower than a predetermined value than when the outside air temperature is higher.

2. A slip control system as claimed in claim 1 wherein:
   said control degree for slip control by said slip control means is set in accordance with a road surface friction coefficient $\mu$; and
   said control degree altering means sets an initial value of said road surface friction coefficient $\mu$ to a smaller value when the outside air temperature sensed by said outside air temperature sensing means is lower than said predetermined value than when the outside air temperature is higher.

3. A slip control system as claimed in claim 2, wherein said control degree gets larger as said road surface friction coefficient $\mu$ gets smaller.

4. A slip control system as claimed in claim 2, wherein:
   an estimated road surface friction coefficient $\mu$ is determined on the basis of a predetermined condition during slip control by said slip control means; and
   said control degree is set on the basis of said estimated road surface friction coefficient $\mu$ during said slip control.

5. A slip control system as claimed in claim 4, wherein said estimated road surface friction coefficient $\mu$ is determined on the basis of a degee of acceleration acting upon a body portion of the automotive vehicle during said slip control.

6. A slip control system as claimed in claim 1, wherein:
   said slip control by said slip control means is started when a predetermined condition for starting said slip control is met; and
   said control degree altering means alters said predetermined condition for starting said slip control so as to perform said slip control more easily when the outside air temperature is lower than said predetermined value than when the outside air temperature is higher.

7. A slip control system as claimed in claim 6, wherein:
said predetermined condition for starting said slip control is set as a predetermined reference value; and
said control degree altering means sets said predetermined reference value to a smaller value when the outside air temperature sensed by said outside air temperature sensing means is lower than said predetermined value than when the outside air temperature is higher.

8. A slip control system as claimed in claim 7, wherein said slip detecting means detects a slip value of the driven wheel relative to the surface of the road;
wherein said slip control by said slip control means is performed by traction control for preventing said slip value detected by said slip detecting means from being excessive during acceleration; and
wherein said predetermined reference value is set as a reference slip value to be compared with the slip value detected by said slip detecting means.

9. A slip control system as claimed in claim 7, wherein:
said slip control by said slip control means is performed by ABS control for preventing the wheel from being locked relative to the road surface during braking; and
said predetermined reference value is set as a degree of deceleration of the wheel.

10. A slip control system as claimed in claim 7, wherein:
said predetermined reference value is set in accordance with the road surface friction coefficient $\mu$; and
said control degree altering means alters an initial value of the road surface friction coefficient $\mu$.

11. A slip control system as claimed in claim 7, wherein said predetermined reference value is corrected in accordance with a running state in which the automotive vehicle is running.

12. A slip control system as claimed in claim 11, wherein said running state includes at least one of a vehicle speed, an opening angle of an accelerator, a steered angle of a steering wheel, and a running mode set manually by an operator.

13. A slip control system as claimed in claim 1, wherein said slip control by said slip control means is performed by traction control for preventing slip of the driven wheel relative to the road surface from becoming excessive during acceleration.

14. A slip control system as claimed in claim 13, wherein:
said slip control is performed by temporarily reducing torque applied to the driven wheel by a predetermined torque portion at the time of starting said slip control; and
an amount of said torque portion to be reduced temporarily is altered by said control degree altering means.

15. A slip control system as claimed in claim 14, wherein:
said amount of said torque portion to be reduced temporarily is set in accordance with a road surface friction coefficient $\mu$; and
said control degree altering means sets an initial value of said road surface friction coefficient $\mu$ to a smaller value when the outside air temperature sensed by said outside air temperature sensing means is lower than said predetermined value than when the outside air temperature is higher.

16. A slip control system as claimed in claim 14, wherein said amount of said torque portion to be reduced temporarily is corrected in accordance with a running state in which the automotive vehicle is running.

17. A slip control system as claimed in claim 16, wherein said running state includes at least one of a vehicle speed, an opening angle of an accelerator, a steered angle of a steering wheel, and a running mode set manually by an operator.

18. A slip control system as claimed in claim 13, wherein said slip detecting means detects a slip value of the driven wheel relative to the surface of the road;
wherein said slip control is performed by said slip control means so as to make the slip value detected by said slip detecting means a predetermined target value; and
said control degree altering means alters said predetermined target value to a smaller value when the outside air temperature sensed by said outside air temperature sensing means is lower than said predetermined value than when the outside air temperature is higher.

19. A slip control system as claimed in claim 18, wherein said slip control is performed by reducing torque generated by an engine.

20. A slip control system as claimed in claim 19, wherein said torque generated by the engine is reduced by adjusting an amount of intake air for the engine.

21. A slip control system as claimed in claim 19, wherein said torque generated by the engine is reduced by adjusting a timing of igniting the engine.

22. A slip control system as claimed in claim 18, wherein said slip control is performed by braking the driven wheel.

23. A slip control system as claimed in claim 18, wherein said predetermined target value is set in accordance with a road surface friction coefficient $\mu$.

24. A slip control system as claimed in claim 23, wherein a lower limit value of the road surface friction coefficient $\mu$ for setting said predetermined target value is so set as not to become smaller than a predetermined lower limit value when said outside air temperature sensed by said outside air temperature sensing means is higher than a predetermined value.

25. A slip control system as claimed in claim 23, wherein said predetermined target value is corrected in accordance with a running state in which the automotive vehicle is running.

26. A slip control system as claimed in claim 25, wherein said running state includes at least one of a vehicle speed, an opening angle of an accelerator, a steered angle of a steering wheel, and a running mode set manually by an operator.

27. A slip control system as claimed in claim 13, wherein said slip detecting means detects a slip value of the driven wheel relative to the surface of the road;
wherein said slip control by said slip control means is started when the slip value detected by said slip detecting means reaches a predetermined reference value or higher; and
wherein said slip control is performed so as to reduce torque to be applied to the driven wheel temporarily by a predetermined torque portion at the time of starting said clip control and to make the slip value detected by said slip detecting means a predetermined target value after the torque to be applied to the driven wheel has been reduced temporarily.

28. A slip control system as claimed in claim 1, wherein:
said slip control by said slip control means is performed such that a slip value of the wheel approaches a predetermined target value; and
said control degree altering means alters said predetermined target value so as to become smaller when the outside air temperature detected by said outside air temperature sensing means is lower than the predetermined value than when the outside air temperature is higher.

29. A slip control system as claimed in claim 1, wherein said slip control by said slip control means is performed by ABS control for preventing the wheel from being locked relative to the road surface during braking.

30. A slip control system as claimed in claim 29, wherein:
said slip control is started when a degree of deceleration of the wheel reaches a predetermined value or lower; and
said control degree altering means alters said predetermined value so as to become smaller when the outside air temperature detected by said outside air temperature sensing means is lower than the predetermined value than when the outside air temperature is higher.

31. A slip control system as claimed in claim 30, wherein:
said predetermined value is set in accordance with a road surface friction coefficient $\mu$; and
said control degree altering means alters an initial value of said road surface friction coefficient $\mu$ to a smaller value when the outside air temperature sensed by said outside air temperature sensing means is lower than said predetermined value than when the outside air temperature is higher.

32. A slip control system as claimed in claim 31, wherein said road surface coefficient $\mu$ is estimated on the basis of a degree of a body portion of acceleration of the automotive vehicle.

* * * * *